June 1, 1937.  C. R. CARR  2,081,902
SEED PAN FOR COTTON LINTERS
Filed Jan. 27, 1936
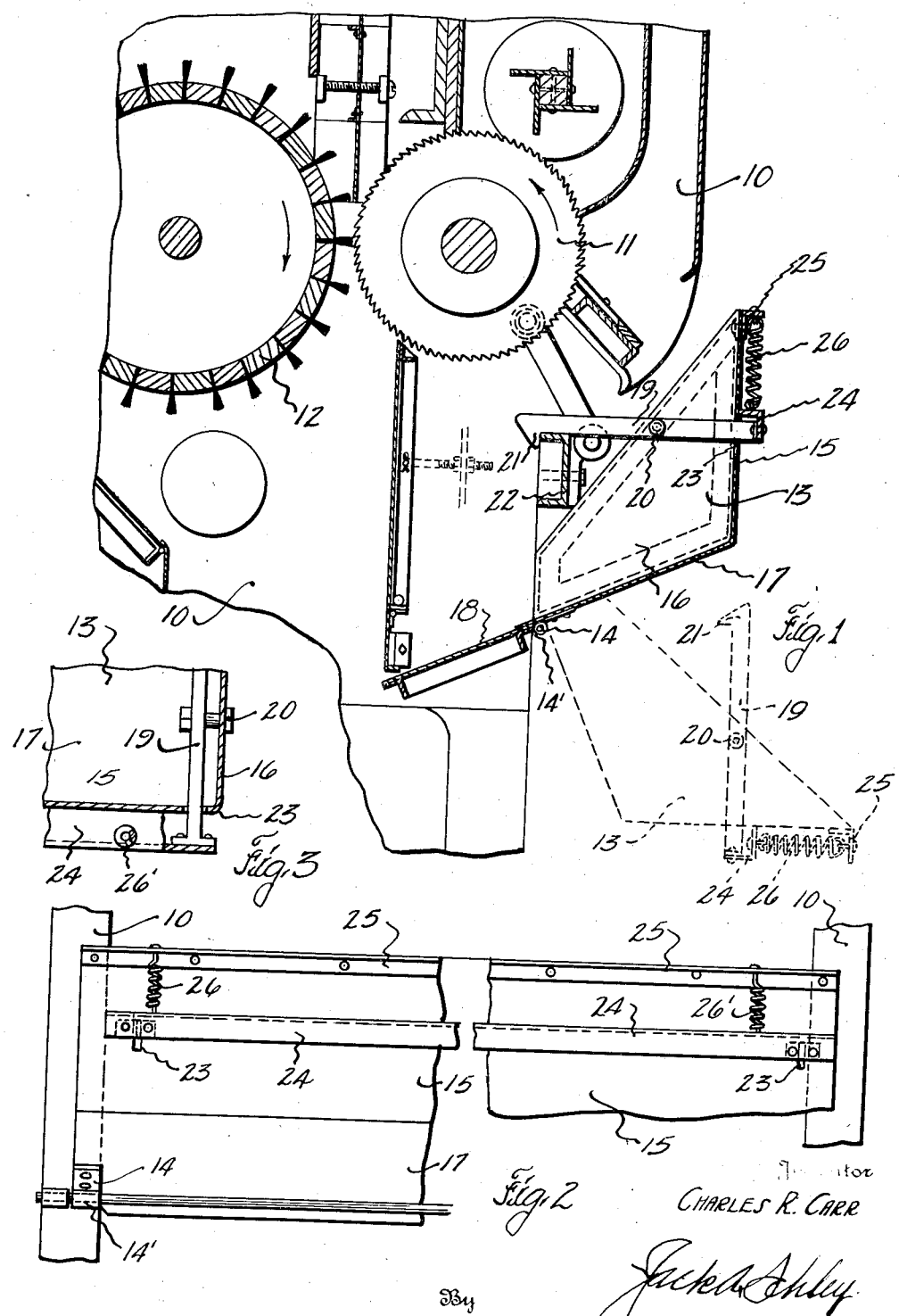
CHARLES R. CARR Patented June 1, 1937

2,081,902

UNITED STATES PATENT OFFICE 2,081,902

SEED PAN FOR COTTON LINTERS

Charles R. Carr, Dallas, Tex., assignor to The Murray Company, Dallas, Tex., a corporation of Texas Application January 27, 1936, Serial No. 60,902

9 Claims. (Cl. 19—55)

This invention relates to new and useful improvements in seed pans for cotton linters.

One object of the invention is to provide an improved seed pan which is particularly adapted for use on cotton linters.

An important object of the invention is to provide an improved seed pan which is pivoted to the linter frame, whereby the entire pan may be swung completely out of the way to permit ready access to the interior of the linter for purposes of cleaning, or for any other reason.

A further object of the invention is to provide a seed pan having latching means arranged to automatically fasten the pan in its closed position when the same is manually swung from its open position.

Still another object of the invention is to provide a seed pan having an automatic latching means, whereby the use of bolts, or other fastenings for securing the pan in its closed position on the linter, is eliminated.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a transverse, vertical, sectional view of a portion of a linter, showing a seed pan and latch constructed in accordance with the invention mounted thereon, Figure 2 is a partial front elevation of the seed pan, and Figure 3 is a detail view, partly in elevation and partly in section, of the mounting of the pan latch.

In the drawing, the numeral 10 designates a linter stand or frame which is provided with the usual saws 11 and brush 12. An elongate seed pan 13, substantially triangular in cross-section, is hinged at its lower edge to the front of the linter frame. Any kind of a hinge may be employed, but I prefer to employ a hinge pin 14 which extends through suitable bearings 14' secured to the pan. By pivoting the pan in this manner, said pan may be swung downwardly, so as to be completely out of the way as is shown in dotted lines in Figure 1.

This pan includes a front wall 15, a pair of end walls 16, substantially triangular in shape, and a bottom 17. The bottom is inclined at the same angle as that of the seed plate 18 of the linter, so that seed falling into the pan 13 will be directed downwardly to and over the plate and through the outlet in the usual manner. For retaining the pan in its closed position (Figure 1), a pair of latch bars 19 are provided. Each bar is pivoted on a pin 20, which extends through each end wall 16 of the pan. The inner end of each latch bar is provided with a hook 21, which engages over a channel bar 22 of the linter frame. The outer end of said latch bar extends forwardly of the linter through a slot 23 in the front wall 15 of the pan.

As is clearly shown in Figure 2, a longitudinal angle bar 24, extending parallel to the front wall of the pan, is carried by the outer ends of the latch bars. The angle bar extends the full length of the pan and the flange of this angle bar is directed inwardly with its edge engaging the wall 15. A similar longitudinal angle bar 25 is fastened to the upper end of this front wall by rivets or other suitable means and the horizontal flange of this bar is directed outwardly from said wall.

A pair of coiled springs 26 and 26' connect the movable angle bar 24, which is carried by the latch bars 19, with the rigid angle bar 25. Each spring has one end secured to the movable bar 24, while its other end is fastened to the bar 25, whereby the springs constantly exert their pressure to hold the outer extended ends of the latch bars upwardly. Due to the pivotal mounting of the latch bars, it will be obvious that the inner end of said bars which are provided with hooks 21, are normally held in a lowered position, whereby when engaged with the channel bar 22, they will be held in such engagement until the outer ends of the bars are manually depressed under tension of the springs. Normally, the pan is in its raised or closed position, with the hooks 21 of the latch bars engaging the channel bar. When it is desired to swing the pan out of the way in order to gain access to the interior of the linter, it is only necessary to manually depress the lower angle bar 24, thus swinging the outer end of the latch bars downwardly on their pivots under tension of the springs 26 and 26'. This swinging of the bars unlatches or disengages the hooks from the channel bar. The pan then may be readily swung to the position shown in dotted lines in Figure 1, whereby it is completely out of the way. Further when said pan is in its open position, there is ready access to the interior of the linter so as to permit cleaning or other operations.

When it is desired to return the pan to its closed position, the operator may manually swing the pan upwardly. As said pan moves into its closed position, the hooks will automatically engage the channel bar because the springs 26 and 26' are holding the hooks downwardly in the path of the bar. Thus the pan is automatically latched in its closed position and will remain so until the lower angle bar 24, which is carried by the outer ends of the latch bars 19, is again depressed to disengage the hooks 21 from the channel bar 22.

It is noted that the automatic latching means eliminates the use of bolts in securing the pan in position, and also there is no need for the usual tools in unfastening the seed pan from the linter. Heretofore, it has usually been necessary to unbolt the pan, consequently causing some delay and no little trouble in removing the pan. In the applicant's device, the operator may swing the pan downwardly by depressing the angle bar with one hand. Said pan may be closed by swinging it upwardly, the automatic latching device holding it in this position. Thus, opening and closing the seed pan for any reason is reduced to two simple movements on the part of the operator.

What I claim and desire to secure by Letters Patent, is:

1. A linter including, a linter frame, a seed pan hinged to the linter frame, and a latch arranged to automatically fasten the pan when the latter is swung to its closed position.

2. A linter including, a linter frame, a seed pan hinged to the linter frame, and a spring actuated latch for automatically fastening the pan when it is swung to its closed position.

3. A linter including, a linter frame, a seed pan hinged to the linter frame, said pan having an inclined bottom so that seed dropping into the pan is discharged into the linter, and a latch being arranged to automatically fasten the pan when the latter is swung to its closed position.

4. A linter including, a linter frame, a seed pan hinged to the linter frame, said pan having an inclined bottom so that seed dropping into the pan is discharged into the linter, and a spring actuated latch for automatically fastening the pan when it is swung to its closed position.

5. A linter including, a linter frame, a seed pan hinged to the linter frame, a pivoted latch for fastening the pan in position, and an angle bar for operating said latch.

6. A linter including, a linter frame, a seed pan hinged to the linter frame, a pivoted latch, and an angle bar for operating said pivoted latch, which latch is arranged to automatically fasten the pan when the latter is swung to its closed position.

7. A linter including, a linter frame, a seed pan hinged to the linter frame, a spring actuated latch, and an angle bar which operates said latch for automatically fastening the pan when it is swung to its closed position.

8. A linter including, a linter frame, an inclined seed plate immovably mounted on the frame, a seed pan hinged to the linter frame at the upper edge of the seed plate, and a latch for fastening the pan so that its bottom alines with the seed plate, whereby said pan may be swung down to expose and give access to the linter saws.

9. A linter including, a linter frame, a seed plate immovably mounted on the frame, a seed pan having an inclined bottom and being hinged to the linter frame at the upper edge of the seed plate, and a latch for fastening the pan so that its bottom alines with the seed plate, whereby said pan may be swung down to expose and give access to the linter saws.

CHARLES R. CARR.